United States Patent [19]

Grant et al.

[11] Patent Number: 5,370,827
[45] Date of Patent: Dec. 6, 1994

[54] SOLUTION DECONTAMINATION METHOD USING PRECIPITATION TECHNIQUES

[75] Inventors: David C. Grant, Gibsonia; Deborah P. Partlow, Export; Edward J. Lahoda, Edgewood Borough; Leland L. Learn, Pittsburgh, all of Pa.

[73] Assignee: Westinghouse Electric Corporation, Pittsburgh, Pa.

[21] Appl. No.: 42,188

[22] Filed: Apr. 2, 1993

[51] Int. Cl.$^5$ .............................. G21F 9/08
[52] U.S. Cl. .................... 588/18; 423/11; 210/682; 210/688
[58] Field of Search ............ 252/626, 631; 423/2, 423/3, 11; 210/682, 688

[56] References Cited

U.S. PATENT DOCUMENTS

| | | | |
|---|---|---|---|
| 2,577,514 | 12/1951 | De Ment | 134/28 |
| 3,167,504 | 1/1965 | Hayden, Jr. | 210/633 |
| 3,287,279 | 11/1966 | Lyon | 252/643 |
| 3,380,916 | 4/1968 | Katz et al. | 210/670 |
| 4,338,286 | 7/1982 | Nakai et al. | 423/12 |
| 4,349,513 | 9/1982 | Ishiwata et al. | 423/12 |
| 4,469,628 | 9/1984 | Simmons et al. | 252/629 |
| 4,501,691 | 2/1985 | Tanaka et al. | 423/11 |
| 5,045,240 | 9/1991 | Skriba et al. | 252/626 |
| 5,077,020 | 12/1991 | Lahoda et al. | 423/18 |
| 5,128,068 | 7/1992 | Lahoda et al. | 252/626 |
| 5,268,128 | 12/1993 | Lahoda et al. | 252/626 |

OTHER PUBLICATIONS

Bruce R. Willey, "Finding Treatment Options for Inorganics," Water/Engineering & Management, Oct. 1987, pp. 28–31.

Larry W. Canter and Robert C. Knox, *Ground Water Pollution Control* (Lewis Publishers, Inc., 1985), pp. 110–120.

Primary Examiner—Donald P. Walsh
Assistant Examiner—Ngoclan T. Mai
Attorney, Agent, or Firm—Daniel P. Cillo

[57] ABSTRACT

Solutions such as for example drinking water, ground water and extracting solutions contaminated with heavy metals and radioactive species, singly or in combination, are treated by first treating the contaminated solution with silicate and ammonium hydroxide solution precipitants. Then the contaminated solution is separately treated with an acid which gels, polymerizes and/or precipitates the contaminant-containing silica matrix to form an easily dewaterable and separable solid. The solid contaminants are readily removed from the cleansed solution by filtration means. The process utilizes a novel combination of steps which maximizes contaminant removal, minimizes waste volume, and produces a treatable waste solid. The preferred precipitants are sodium silicate, and ammonium hydroxide. The preferred mineral acid is hydrochloric acid.

22 Claims, 1 Drawing Sheet

SOLUTION DECONTAMINATION METHOD USING PRECIPITATION TECHNIQUES

BACKGROUND OF THE INVENTION

This invention relates generally to precipitation methods for decontaminating various types of solutions which are contaminated with a variety of contaminants such as heavy metals and radioactive compounds, using a novel combination of treatment steps. More particularly, this invention relates to methods for remediating water contaminated with uranium, thorium, mercury and/or copper, using sodium silicate, ammonium hydroxide and hydrochloric acid, to precipitate the contaminants and ultimately separate them from solution.

There is increasing concern over the hazards posed by the rising levels of inorganic contaminants within the world's water supplies due to accidental spills, leaks, mining practices and poor disposal practices. Most heavy metal contaminants are toxic to some degree to all life-forms. In humans, toxic heavy metal poisoning can lead to severe nervous system disorders and can cause death.

It has been suggested that various inorganic contaminants in solution can be removed via precipitation solution using, for example, carbonates, hydroxides, sulfides, and/or silicates. Such techniques are described in Canter, L. W., and Knox, R. C., Ground Water Pollution Control, Lewis Publishers, Inc., 1985, pp. 110-120; and Willey, B. R., *Finding Treatment Options for Inorganics,* in WATER/Engineering & Management, October, 1987, pp. 28-31.

In particular, the use of sodium silicate (also referred to as water glass or $Na_2SiO_3$) to remove uranium and/or thorium from waste streams has been suggested. For example, in U.S. Pat. No. 4,501,691, issued in the name of Tanaka et al., on Feb. 26, 1985, there is described a process for treating radioactive liquid waste in which the liquid waste is treated with sodium silicate to form a uranium containing silica precipitate. The precipitate subsequently is treated in a step-wise fashion with acid to recover the uranium, and then alkali metal hydroxide solution to regenerate the water glass.

Silicate precipitation processes for uranium and thorium recovery also are described in U.S. Pat. Nos. 4,349,513, issued Sep. 14, 1982, in the name of Ishiwata et al.; U.S. Pat. No. 5,077,020, issued Dec. 31, 1991, in the name of Lahoda et al; and U.S. Pat. No. 4,338,286, issued Jul. 6, 1982, in the name of Nakai et al. In Ishiwata, the liquid waste is treated with sodium silicate in the presence of aqueous fluorine and ammonia to make a uranium/thorium-containing silicate precipitate which is filtered out of the process stream find sent to a holding tank. In Lahoda et al., the contaminated stream is treated with sodium silicate in the presence of ammonia, fluoride, and nitrate in water. Nakai et al. generally describe a precipitation process for treating liquids contaminated with uranium/thorium wherein sodium silicate is added to the solution in the presence of ammonia water and chlorine to cause a contaminant-containing silica precipitate to form.

There are significant disadvantages associated with the application of each of these methods. For example, carbonate systems, while relatively easy to operate, are difficult to control and often result in processing problems such as premature plugging of equipment. Sulfide systems are difficult to handle, complex to operate, and frequently produce a high waste volume and harmful residual levels of precipitating agent. Hydroxide systems are widely used to remove inorganics because they are the most reliable, and have the added advantages of ease in chemical handling and low volume of sludge. However, the resulting sludge often is gelatinous and difficult to dewater, making treatment, separation, and storage of the contaminated material difficult. In addition, pH must be precisely controlled. Otherwise, contaminant-containing precipitate can readily go back into solution.

The above mentioned silicate precipitation methods suffer from at least two critical drawbacks. First, typically such methods produce a contaminant-containing, slime or sludge which is not readily treatable, separable, or easily stored. For example, the slime/sludge is not easily dewatered, making further treatment with filtration devices either impossible (due to plugging) or impractical (due to excessively slow filtration rates). Second, silicate precipitation generally is not effective on other inorganic contaminants; for example, silicates do not readily precipitate other heavy metals like mercury. Consequently, silicate precipitation methods are slow, inefficient, and ineffective in reducing the level of uranium, thorium and other heavy metals to environmentally acceptable levels.

What is needed is a simplified, easy-to-operate method of treating large volumes of solutions containing heavy metals and radioactive contaminants, singly or in combination, which effectively segregates the contaminates from the clean solution and concentrates the contaminated material in a manageable, low volume, concentrated waste stream.

There is a further need for a system that can effectively and economically remove metals from contaminated solutions, whereby the contaminated material is readily separable from the cleansed solution, especially by filtration methods.

There is also a need for a process which can effectively remove various metal contaminants like uranium, thorium, mercury, and copper from solution.

SUMMARY OF THE INVENTION

These and other needs are satisfied by the invention which is characterized by treating process streams such as groundwater, drinking water, soil extracting solutions, leaching solutions, and the like, which are contaminated with various inorganic contaminates, either singly or in combination, with a unique combination of treatment steps. In the process of the invention, the contaminated process stream is treated with a unique combination of precipitating/gelling/polymerization agents comprising silicate, ammonium hydroxide, and acid. The acid is added to the process stream after the addition of silicate and ammonium hydroxide, in an amount sufficient to lower the pH of the stream to between about 5 to about 9.5. Next, the stream is allowed to age for a time sufficient to allow the contaminant-containing silica matrix to gel, polymerize and/or precipitate to a filterable "solid". The resulting solid is readily dewatered and can be quickly separated from the clean stream.

In practicing the precipitation method of the invention, it is important that the precipitating agents are added in the proper sequence and at the required amounts, that the proper pH of the stream is maintained, and that the stream is permitted to age for the requisite length of time. It has been found that the controlled addition of the sequence of precipitating agents, the maintenance of pH, and proper aging of the stream minimizes the consumption of precipitating agent and the generation of waste volume, and results in a contaminated solid which is readily filterable in minutes, as opposed to hours or even days. Consequently, a smaller amount of precipitant is used, a manageable volume of waste is generated, and a lower disposable/clean-up cost is incurred.

Moreover, the inventors experimentally have determined that it is the combination of sodium silicate with ammonium hydroxide which renders the present process more effective at removing a wider variety of contaminants. For example, as indicated in Table 1, the use of sodium silicate alone, sodium silicate with ammonium chloride, or sodium silicate with sodium hydroxide, was not effective at removing mercury from a contaminated stream to desirable levels. It was only when both sodium silicate and ammonium hydroxide precipitants were added that levels of +99% mercury removal were obtained. Similarly, +99% copper removal was achieved only through the combined use of sodium silicate and ammonium hydroxide precipitants.

TABLE 1

Effectiveness of Ammonium Hydroxide Addition on Heavy Metal Removal Using Sodium Silicate

| Additive* | Contaminant | % Contaminant Removed |
| --- | --- | --- |
| None | Mercury | 0% |
| 0.25 g/L Ammonium Hydroxide | Mercury | +99% |
| 0.25 g/L Ammonium Chloride | Mercury | 71.4% |
| 0.25 g/L Sodium Hydroxide | Mercury | 3.5% |
| None | Copper | 99% |
| 0.25 g/L Ammonium Hydroxide | Copper | +99% |

*Added with 5 g/L sodium silicate to contaminated water stream

The inventors also have found that after the addition of silicate and ammonium hydroxide, the pH of the stream must be adjusted to between about 5 to about 9.5 with mineral acid. As FIG. 1 indicates, contaminant removal is optimized at a pH above about 7, while less than about 10% of contaminant is removed at a pH below about 5. Accordingly, if the pH of the stream is permitted to go below about 5, unsatisfactory amounts of contaminants are likely to remain in the process stream.

With respect to one preferred embodiment of the invention, the method for removing metals from a contaminated stream comprises the steps of:

a. treating the process stream with sodium silicate in an amount of from about 5 to about 25 g/L of stream to be treated, and ammonium hydroxide in an amount of from about 0.1 to about 1 g/L of stream to be treated to precipitate said contaminants;

b. adding a mineral acid to the process stream in an amount sufficient to lower the pH of the stream to between about 7 to about 7.5;

c. allowing said stream to age for about 1 to about 5 hours; and d. separating the clean stream from the precipitate.

Accordingly, it is an object of this invention to provide a precipitation method for the decontamination of solutions which produces a clean solution having environmentally acceptable levels of contamination, and readily manageable waste having a relatively low volume.

It is a further object of this invention to provide a precipitation method for the decontamination of solutions wherein the contaminant containing waste is easy to handle, and simple to treat, separate and store.

It is yet another object of this invention to provide a precipitation method which can be utilized to remove a variety of heavy metals.

BRIEF DESCRIPTION OF THE DRAWING

A full understanding of the invention can be gained from the following description of the preferred embodiments when read in conjunction with the accompanying drawings in which.

DETAILED DESCRIPTION OF THE INVENTION

Figure 1:
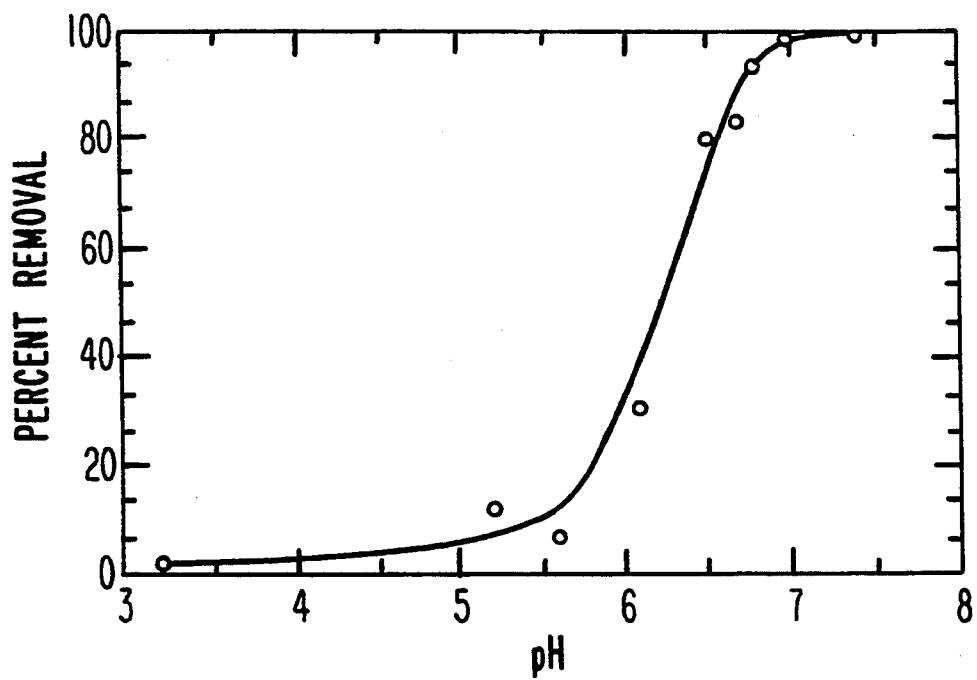
FIG. 1 is a graph demonstrating one advantage of the present invention; namely, illustrating the effect of pH of the processing stream on the contaminant level.

The present invention is directed to methods for treating various solutions which are contaminated with soluble and insoluble inorganic (including radioactive) species. While this process will be described primarily for removal of metals like uranium, thorium, lead, mercury, copper, cesium, barium, cadmium, and mixtures thereof, it is also suitable for removal of radium, arsenic, boron, chromium, silver, selenium, beryllium, nickel, antimony, molybdenum, vanadium, zinc, thallium, strontium, cobalt, plutonium, and the like.

As used herein, the term "process stream" includes all forms of solutions in which contaminates may be found, such as, for example, groundwater, drinking water, soil washing extractants, leachates, effluents, etc. It also specifically includes uranium/thorium-containing waste streams produced by nuclear fuel handling/manufacturing facilities, and by mining facilities.

The term "silicate" as used herein refers to the salt of silicic acid, or any compound that contains silicon, oxygen, and one or more metals, and may contain hydrogen. Silicates further include any of a group of minerals whose crystal lattice contains $SiO_4$ tetrahedra, either isolated or joined through one or more oxygen atoms.

The term "age" as used herein means to cause or allow to stand for a certain period of time (with or without stirring), or until certain transformations have taken place, namely, until the contaminant-containing silica matrix has gelled, polymerized and/or precipitated.

The term "gel" as used in the present invention includes the formation of any jelly-like colloid, solution or suspension.

For purposes of the invention described herein, "precipitates" include coprecipitates, and vice versa, and both terms include any substance precipitated from solution.

The method of the invention begins by treating the contaminated process stream with precipitants, specifically silicate and ammonium hydroxide. In solution, the silicate becomes amorphous silica which has a large surface area and a high reactivity. It is believed that the amorphous silica reacts with the metal contaminants in solution by providing adsorption or exchange sites which capture the metal contaminants, thereby forming amorphous silica precipitates.

The process stream may be treated with any suitable silicate known to the those skilled in the art, including, for example, sodium silicate, potassium silicate, tetraethylorthosilicate, tetramethylorthosilicate, or a mixture thereof. Preferably the stream is treated with sodium silicate having the formula:

$Na_2O * nSiO_2$, where $n = 2$ to $3.5$

As the value of n increases, the silicate level increases, thereby increasing the likelihood that precipitation will occur. If n is outside of the these ranges, precipitation will not occur as efficiently, that is, more reactant will be required to accomplish the job or too much waste will be generated.

Preferably, the sodium (or potassium) silicate is added as a liquid which comprises from about 1% to about 50% sodium (or potassium) silicate by weight, more preferably from about 2% to about 35%, even more preferably from about 2% to about 10%, and most preferably from about 4% to about 8%.

The amount of silicate to be added is determined by the condition of the stream to be treated. Preferably, the amount of silicate added should be from about 0.5 to about 250 g/L of stream to be treated, more preferably from about 1 to about 100 g/L, and most preferably from about 5 to about 25 g/L. As shown in Table 2, increasing the amount of silicate (for example, from 5 to 15 g/L of solution to be treated) reduces the aging time required for successful gelation, polymerization and/or precipitation, as well as the filtration time.

TABLE 2

Effect of Silicate Concentration on Aging Time Required for Successful Filtration

| Silicate Level, g/L | Aging Time, hr | Filtration Time | Filtration Contamination |
|---|---|---|---|
| 5 | 30 minutes | 24 sec | Highly Contaminated |
| 5 | 180 minutes | >2 hours | Low (<1 ppm) |
| 5 | 300 minutes | 23 minutes | Low (<1 ppm) |
| 10 | 75 minutes | 60 minutes | Low (<1 ppm) |
| 10 | 120 minutes | 26 minutes | Low (<1 ppm) |
| 10 | 180 minutes | 15 minutes | Low (<1 ppm) |
| 15 | 75 minutes | 10 minutes | Low (<1 ppm) |

Although treatment with silicates will significantly reduce the solubility of the contaminants in the stream, it generally will not be adequate to precipitate the contaminants to a degree which will permit collection and removal of contaminants to environmentally acceptable levels. Due to the nature of the precipitate (which tends to be a slimy or sludge-like), it may be difficult to collect the precipitate and separate it from the solution. In this regard, the addition of ammonium hydroxide solution and hydrochloric acid enhances contaminant removal and aids in the separation and collection of precipitate from the cleansed solution.

The ammonium hydroxide solution promotes precipitation because the solubility of many metal hydroxides is relatively low. The silicate, which has a high surface area, then acts as a scavenger for the precipitated metal hydroxide contaminants.

Preferably the stream is treated with ammonium hydroxide solution or ammonia gas comprising from about 1% to about 30% ammonium hydroxide by weight, even more preferably from about 10% to about 30% by weight, and most preferably from about 20% to about 30%. If ammonia gas is used, it can be sprayed directly into the solution.

In order to ensure precipitation of substantially all of the contaminant, the ammonium hydroxide solution should be added in an amount of from about 0.001 to about 100 g/L of stream to be treated, preferably from about 0.01 to about 10 g/L, and most preferably from about 0.1 to about 1 g/L.

The silicate and ammonium hydroxide precipitants may be added sequentially and in any order, or they may be added concurrently. However, the pH of the process stream should not be lowered with addition of acid until after the precipitants have been added.

In the next step the stream is treated with any suitable acid known to those skilled in the art. Upon addition of acid to the stream, the contaminant-containing silica matrix will begin to gel, polymerize and/or precipitate. Generally, upon the addition of acid, clear liquid will begin to cloud and/or thicken, and solid particles will begin to form. Eventually the particles may get large enough in size to settle out of solution.

For the reasons indicated above, it is important to obtain and maintain the pH of process stream in this step. Thus, the pH of the stream should be continuously monitored as the acid is slowly added. Preferably, acid should be added in a drop-wise fashion in an amount sufficient to lower the pH to between about 6 and about 8.5, more preferably to between about 7 to about 8, and most preferably to between about 7 to about 7.5.

Mineral acids are most suitable for use in this step. Mineral acids selected from the group consisting of hydrochloric acid, nitric acid, sulfuric acid, phosphoric, or a mixture thereof, are preferred. Hydrochloric acid is even more preferred. In addition, acetic acid, formic acid, or other suitable organic acids known to those of skill in the art also may be used alone or in combination with the above mentioned mineral acids.

In the next step of the process, the mixture is given sufficient time for the desired gelling, polymerization, and/or precipitation reactions to occur. Allowing for sufficient aging time is essential in order to remove the desired amounts of contamination from the solution and to produce a waste-containing "solid" which readily filters at an acceptable filtration rate. "Solid" as used herein and for purposes of the present invention includes any filterable precipitate, gel or polymer.

Preferably, the stream is aged for about 5 minutes to about 15 hours, more preferably for about 30 minutes to about 10 hours, and most preferably for about 1 to 5 hours. If adequate time is not permitted for aging, the filtration rate is likely to be extremely slow and the filtrate will contain excessive and undesirable levels of contaminant.

The gelled, polymerized and/or precipitated solids are easily handled and separated from the clean solution using any suitable technique known to those of ordinary skill in the art, including flocculation, settling and/or filtration techniques. Filtration techniques can be used to separate the waste-containing solid from the filtrate without substantial plugging or clogging of the filtration device, and at relatively rapid rates, i.e., within minutes. Suitable filtration techniques include but are not limited to vacuum filtration, filter press, or filter membranes.

Preferably, each of the above described steps are undertaken sequentially and in the order set forth above; namely, the precipitating agents are added first, followed by addition of mineral acid, followed by the aging step, followed by separation of the clean stream from the contaminant-containing precipitate. In one preferred embodiment, addition of sodium silicate is followed by treatment with ammonium hydroxide solution, which is followed by treatment with hydrochloric acid, which is followed by aging and separation. In another embodiment, the ammonium hydroxide solution is added prior to treatment with sodium silicate. In yet another embodiment, the precipitants are added simultaneously.

Although the above described method may be used in-situ and/or as a continuous process, it is intended to be used off-site and above ground in any suitable batch process wherein the entire process is carried out in one mixing tank. Although the method of the invention is ideal for treating uranium/thorium contaminated effluents, it also is suitable for treating extracting solutions used in various soil washing processes, such as those described in U.S. Pat. No. 5,128,068, which issued on Jul. 7, 1992, from U.S. patent application Ser. No. 529,092, filed May 25, 1990; U.S. patent application Ser. No. 648,673, filed Jan. 31, 1991, U.S. Pat. No. 5,268,128, which issued on Dec. 7, 1993, from U.S. Pat. No. 5,045,240, issued on Sep. 3, 1991, from U.S. patent application Ser. No. 345,852, filed May 1, 1989; and U.S. patent application Ser. No. 722,458, filed Jun. 27, 1991, in the name of Grant, et al., the disclosures of which are incorporated herein in their entirety.

With the method of the present invention, it is possible to lower the amount of inorganic contamination to environmentally acceptable levels as set forth in the Federal Primary Drinking Water Standard (40 C.F.R., Part 141).

The ability to accomplish solution decontamination using the methods of the invention, and in particular the novel combination of process steps, is demonstrated in the following example.

EXAMPLE 1

A sample of water (approximately 400 g) contaminated with about 20 milligrams of copper was successfully treated according to the method of the invention as follows.

Approximately 1 g of ammonium hydroxide (10 weight percent) was added to the water sample with stirring. Then approximately 13.6 g of sodium silicate (6 weight percent) was added to the solution with stirring. Next, concentrated hydrochloric acid (about 38 weight percent) was added dropwise to the solution while monitoring the pH. The pH of the stream dropped to between about 7.1 and 7.2 after the addition of about 3.5 g of acid. No additional acid was added.

The solution was then mixed for an additional 5 minutes and then allowed to remain undisturbed for about 3 hours. The precipitated solids were easily separated from the solution by vacuum filtration.

The resultant solution contained less than 0.2 milligrams of copper per liter of solution.

From the above, it can be seen that the invention provides a simple, yet highly effective method for treating solutions contaminated with inorganic and radioactive species. The process utilizes a novel combination of steps which maximize contaminant removal, minimize waste volume, and produce a manageable waste stream. In addition, the method of the invention results in a precipitate which is readily treated and separated from the cleansed solution.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A method for removing heavy metals and/or radioactive contaminants from contaminated process streams, said method comprising the steps of:
   a. treating the process stream with silicate and ammonium hydroxide to precipitate said contaminants; and then
   b. adding an acid to the process stream in an amount sufficient to lower the pH of the stream to between about 5 to about 9.5; and then
   c. allowing said stream to age; and then
   d. separating a cleaned stream from the precipitate.

2. The method of claim 1 wherein step (a) comprises adding a silicate selected from the group consisting of sodium silicate, potassium silicate, tetraethylorthosilicate, tetramethylorthosilicate, and a mixture thereof.

3. The method of claim 1 wherein step (a) comprises adding sodium silicate in an amount of from about 0.5 to about 250 g/L of stream to be treated.

4. The method of claim 3 wherein step (a) comprises adding sodium silicate in an amount of from about to about 100 g/L.

5. The method of claim 3 wherein step (a) comprises adding sodium silicate in an amount of from about 5 to about 25 g/L.

6. The method of claim 1 wherein step (a) comprises adding ammonium hydroxide in an amount of from about 0.001 to about 100 g/L of stream to be treated.

7. The method of claim 6 wherein step (a) comprises adding ammonium hydroxide in an amount of from about 0.01 to about 10 g/L.

8. The method of claim 6 wherein step (a) comprises adding ammonium hydroxide in an amount of from about 0.1 to about 1 g/L.

9. The method of claim 1 wherein step (b) comprises adding a mineral acid selected from the group consisting of hydrochloric acid, nitric acid, sulfuric acid, phosphoric acid, and a mixture thereof.

10. The method of claim 1 wherein step (b) comprises adding said acid in an amount sufficient to lower the pH to between about 6 and about 8.5.

11. The method of claim 10 wherein step (b) comprises adding said acid in an amount sufficient to lower the pH to between about 7 to about 8.

12. The method of claim 10 wherein step (b) comprises adding said acid in an amount sufficient to lower the pH to between about 7 to about 7.5.

13. The method of claim 1 wherein step (c) comprises aging said stream for about 5 minutes to about 15 hours.

14. The method of claim 13 wherein step (c) comprises aging said stream for about 30 minutes to about 10 hours.

15. The method of claim 13 wherein step (c) comprises aging said stream for about 1 to 5 hours.

16. The method of claim 1 wherein step (c) comprises aging said stream for a time sufficient to gel, polymerize, and/or precipitate a contaminant-containing silica matrix.

17. The method of claim 16 wherein said gel, polymer and/or precipitate is readily separable from the stream.

18. The method of claim 17 wherein said gel, polymer and/or precipitate is rendered readily separable by the addition of flocculant.

19. The method of claim 1 wherein step (d) comprises separating said precipitate by filtration means.

20. The method of claim 1 wherein the process stream contains a metal selected from the group consisting of uranium, thorium, cesium, lead, copper, barium, cadmium, mercury, radium, arsenic, boron, chromium, silver, selenium, beryllium, nickel, antimony, molybdenum, vanadium, zinc, thallium, strontium, cobalt, plutonium, and a mixture thereof.

21. The method of claim 1 wherein step (b) comprises adding an organic acid.

22. A method for recovering uranium and/or thorium from a process stream containing uranium and/or thorium, said method comprising the steps of:
   a. adding sodium silicate and ammonium hydroxide to the process stream to precipitate said contaminates in a silica matrix;
   b. adding hydrochloric acid to the process stream in an amount sufficient to reduce the pH of the stream to between about 5 to about 9.5;
   c. allowing the stream to age for a time sufficient to gel, polymerize, and/or precipitate said contaminant-containing silica matrix to form a filterable solid; and
   d. filtering a cleaned stream from precipitate;
wherein steps (a)–(d) are carried out sequentially.

* * * * *